(12) United States Patent
Mathon et al.

(10) Patent No.: US 9,168,668 B2
(45) Date of Patent: Oct. 27, 2015

(54) DEVICE FOR ASSISTING IN CUTTING A LAYER OF FIBER TEXTURE WOUND ON AN IMPREGNATION MANDREL OF A WINDING MACHINE

(75) Inventors: Richard Mathon, New Castle, NH (US); Antoine Phelippeau, Portsmouth, NH (US); Micah Gummel, East Kingston, NH (US)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/237,000

(22) PCT Filed: Jul. 31, 2012

(86) PCT No.: PCT/FR2012/051803
§ 371 (c)(1),
(2), (4) Date: Feb. 4, 2014

(87) PCT Pub. No.: WO2013/017796
PCT Pub. Date: Feb. 7, 2013

(65) Prior Publication Data
US 2014/0202300 A1    Jul. 24, 2014

(30) Foreign Application Priority Data
Aug. 4, 2011 (FR) ...................................... 11 57146

(51) Int. Cl.
*B29C 70/02* (2006.01)
*B26B 29/06* (2006.01)
*B26D 7/00* (2006.01)

(52) U.S. Cl.
CPC .............. *B26D 7/0006* (2013.01); *B26B 29/06* (2013.01); *B29C 70/02* (2013.01); *Y10T 83/8878* (2015.04); *Y10T 83/8889* (2015.04)

(58) Field of Classification Search
CPC ...... B26D 7/0006; B26B 29/06; B29C 70/02; B29C 2793/0063
See application file for complete search history.

(56) References Cited

U.S. PATENT DOCUMENTS

| 4,851,065 A | * | 7/1989 | Curtz ............................ 156/172 |
| 5,392,676 A |   | 2/1995 | Drury |
| 5,779,851 A | * | 7/1998 | Ifkovits et al. ................. 156/505 |
| 5,946,999 A |   | 9/1999 | Kahn |
| 6,053,086 A | * | 4/2000 | Smyth ............................. 83/648 |

(Continued)

FOREIGN PATENT DOCUMENTS

| DE | 1020032322 A1 * | 2/2012 |
| EP | 1 961 923 A2    | 8/2008 |

(Continued)

OTHER PUBLICATIONS

International Search Report issued Sep. 19, 2012, in PCT/FR12/051803 filed Jul. 31, 2012.

*Primary Examiner* — Robert B Davis
(74) *Attorney, Agent, or Firm* — Oblon, McClelland, Maier & Neustadt, L.L.P.

(57) ABSTRACT

A device for assisting in cutting of a fiber texture layer wound on an impregnation mandrel of a winding machine, the device including two positioning stops each configured to be positioned on a respective side plate of the impregnation mandrel, and a plate forming a cutting jig that is configured to be positioned on the fiber texture layer that is to be cut in register with the protective film, the plate including a slot extending in position between the side plates of the impregnation mandrel and serving to guide a cutting tool.

9 Claims, 4 Drawing Sheets

(56) References Cited

U.S. PATENT DOCUMENTS

2006/0118244 A1    6/2006    Zaballos et al.
2008/0206048 A1    8/2008    Coupe et al.

FOREIGN PATENT DOCUMENTS

FR           2758735 A1 *  7/1998
WO    WO 2006/060270 A1    6/2006

* cited by examiner

DEVICE FOR ASSISTING IN CUTTING A LAYER OF FIBER TEXTURE WOUND ON AN IMPREGNATION MANDREL OF A WINDING MACHINE

BACKGROUND OF THE INVENTION

The present invention relates to the general field of making gas turbine casings out of composite material, and more particularly of making fan retention casings for aeroengine gas turbines.

In a gas turbine aeroengine, a fan casing performs several functions: it defines the inlet passage for admitting air into the engine, it supports an abradable material in register with the tips of the fan blades, it optionally supports a structure for absorbing soundwaves in order to provide acoustic treatment at the inlet of the engine, and it incorporates or supports a retention shield. The shield constitutes a trap for retaining debris such as articles that have been ingested or fragments of damaged blades that are projected outwards by centrifuging, for the purpose of preventing them from passing through the casing and striking other portions of the aircraft.

It is common practice for a fan retention casing to be made of a relatively thin wall defining the air inlet passage and supporting an abradable material in register with the path followed by the tips of the fan blades, together with the acoustic treatment coating, if any, and by a shield structure that is fastened to this wall on its outside, in register with the fan.

Proposals have already been made to make a fan retention casing out of composite material. By way of example, reference may be made to document EP 1 961 923, which describes fabricating a casing of varying thickness out of composite material comprising forming fiber reinforcement in the form of superposed layers of a fiber texture and densification of the fiber reinforcement by means of a matrix. More precisely, that document provides for using a takeup mandrel for use in three-dimensionally weaving the fiber texture, with the texture then being wound as superposed layers onto an impregnation mandrel presenting both an outside surface of profile corresponding to the profile of the central portion of the casing that is to be fabricated, and also two side plates corresponding to the fastener flanges of the casing. The fiber preform as obtained in this way is held on the impregnation mandrel and it is impregnated with resin, which resin is then polymerized.

Practical performance of that method raises the problem of transferring the fiber texture from the takeup mandrel onto the impregnation mandrel. In order to solve that problem, the Applicant has made proposals in French patent application FR 11/53212 (not yet published) for a winding machine that makes it possible, while transferring the fiber texture from the takeup mandrel to the impregnation mandrel, simultaneously to position the fiber texture correctly on the impregnation mandrel and to apply an appropriate winding tension.

With such a machine, there is a problem of cutting the fiber texture at the end of winding. That operation requires a cutting tool to be positioned very accurately in order to avoid any inaccuracy in the cutting, which would have the consequence of creating a localized zone that is either too rich in fibers (cut too long), or else too rich in resin (cut too short).

OBJECT AND SUMMARY OF THE INVENTION

A main object of the present invention is thus to resolve such a problem by proposing a device for providing assistance in cutting the preform at the end of winding, which device provides very great control over the position of the cutting.

In accordance with the invention, this object is achieved by a device for assisting in the cutting of a fiber texture layer wound on an impregnation mandrel of a winding machine, the device comprising: two positioning stops, each designed to be positioned on a respective side plate of the impregnation mandrel, and a plate forming a cutting jig that is designed to be positioned on the fiber texture layer that is to be cut in register with the protective film, said plate being provided with a slot extending in position between the side plates of the impregnation mandrel and serving to guide a cutting tool.

The device of the invention presents numerous advantages. In particular, it makes it possible to ensure that the cut is accurately positioned so as to avoid any risk of creating a local zone that is too rich in fibers or in resin. Furthermore, the cutting operation can be performed while limiting any handling of the preform as much as possible so as to reduce any deformation thereof. Ultimately, the time required for performing this operation can be reduced considerably.

Preferably, the positioning stops are connected to each other by a protective film for positioning under the fiber texture layer that is to be cut. The presence of the protective film under the fiber texture layer that is to be cut thus makes it possible to avoid any degradation of the preform during the cutting operation.

The protective film may be made of a flexible plastics material. In particular, the protective film may be made of polyamide and it may possess thickness of the order of about 3 millimeters (mm).

Also preferably, the device further comprises means for holding the positioning stops in position on the side plates of the impregnation mandrel. Such means make it possible in particular to be able to preposition the device before the end of winding. This leads to a saving of time for the cutting operation.

The plate may be suitable for being positioned at each of its ends on the positioning stops. Under such circumstances, the device advantageously comprises means for adjusting the positions of the ends of the plate on the positioning stops. Such means make it possible to refine the position of the slot in the plate over the fiber texture layer that is to be cut, and thus of the location where the cut is to be made.

The positioning stops may be rigid. In particular, the positioning stops may be made of aluminum.

The invention also provides a winding machine for winding a fiber texture onto an impregnation mandrel, the machine comprising a takeup mandrel for the purpose of storing a fiber texture obtained by three-dimensional weaving, the takeup mandrel having an axis of rotation that is substantially horizontal, an impregnation mandrel onto which the fiber texture stored on the takeup mandrel is to be wound in superposed layers, the impregnation mandrel having an axis of rotation that is substantially horizontal and parallel to the axis of rotation of the takeup mandrel, at least one electric motor for driving the mandrels in rotation about their respective axes of rotation, a control unit for controlling the electric motor(s) for driving the mandrels in rotation, and a device for assisting in cutting a layer of the fiber texture as defined above.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF THE INVENTION

The invention is described below in the context of its application to fabricating a fan casing for a gas turbine aeroengine.

An example of a method for fabricating such a fan casing is described in document EP 1 961 923, to which reference may be made.

The casing is made of a composite material having fiber reinforcement densified by a matrix. The reinforcement is made of fibers that may for example be made of carbon, glass, aramid, or ceramic, and the matrix is made of polymer, e.g. epoxy, bismaleimide, or polyamide.

Briefly, the method of fabrication described in that document consists in making a fiber texture by three-dimensional weaving with takeup in the warp direction onto a drum (referred to below as the takeup mandrel) having a profile that is determined as a function of the profile of the casing to be fabricated.

The fiber texture as made in that way is then transferred onto the mandrel of a resin injection mold (referred to below as the impregnation mandrel) of outside profile that corresponds to the inside profile of the casing to be fabricated.

With the preform held on the impregnation mandrel, impregnation is then performed using a resin. For this purpose, a covering is applied to the preform and the resin is injected into the mold as constituted in that way. Injection may be assisted by establishing a pressure difference between the inside and the outside of the mold in which the preform is located. After impregnation, a step of polymerizing the resin is performed.

Figure 1:
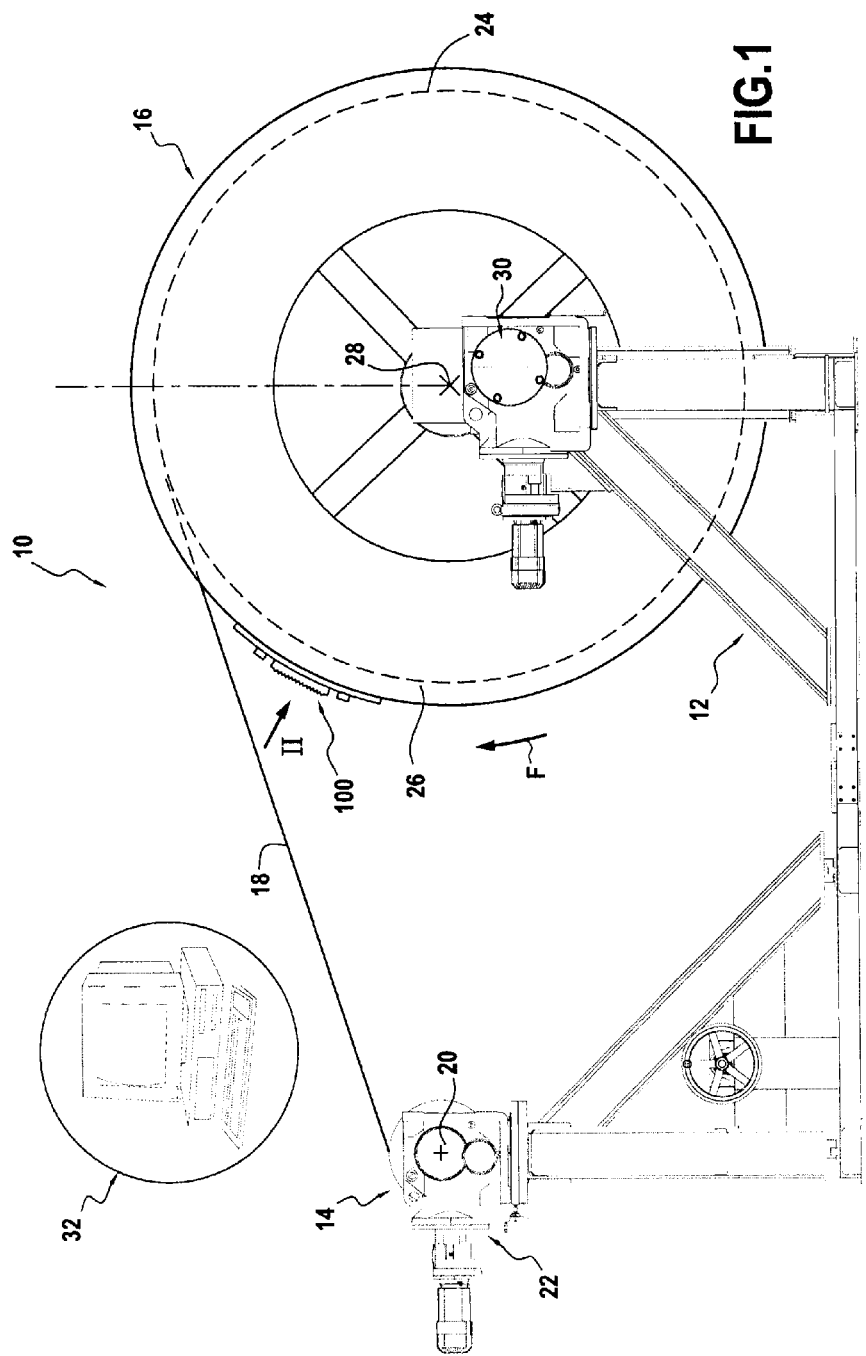
FIG. 1 is a side view of a machine for winding a fiber texture onto an impregnation mandrel and including a cutting assistance device of the invention.

The invention applies to any type of winding machine having the function of enabling the fiber texture that is stored in the takeup mandrel to be transferred automatically onto the impregnation mandrel of the resin injection mold, such as that shown FIG. 1.

Reference may be made to patent application FR 11/53212 (not yet published), which describes the structure and the operation of such a machine in detail.

Briefly, the winding machine 10 comprises a support structure 12 supporting in particular a takeup mandrel 14 and an impregnation mandrel 16. These mandrels are removable, i.e. they can be separated from the support structure.

The takeup mandrel 14 receives the fiber texture 18, e.g. as obtained by three-dimensional weaving. It is carried by a horizontal-axis shaft 20 having one end rotatably mounted on the support structure 12 of the winding machine and having its other end coupled to the outlet shaft of an electric motor 22, e.g. an alternating current (AC) gearmotor.

The assembly constituted by the takeup mandrel 14, its shaft 20, and its electric motor 22 can move in translation relative to the support structure along the axis of rotation of the takeup mandrel. This degree of freedom of the takeup mandrel to move in translation enables the mandrel to be aligned with the impregnation mandrel prior to winding the fiber texture onto the impregnation mandrel.

The impregnation mandrel 16 of the winding machine is for receiving superposed layers of the fiber texture stored on the takeup mandrel. It has an outside surface 24 of profile that matches the profile of the inside surface of the casing to be made, and two side plates 26 of profiles that correspond to the profiles of the outer flanges of the casing at its upstream and downstream ends in order to enable it to be assembled with and connected to other elements.

The impregnation mandrel is carried by a horizontal-axis shaft 28 that is parallel to the axis of rotation 20 of the takeup mandrel and that has one end rotatably mounted on the support structure 12 of the winding machine and its other end coupled to the outlet shaft of an electric motor 30, e.g. an AC gearmotor.

A control unit 32 is connected to the electric motors 22 and 30 of the two mandrels and it serves to control and monitor the speed of rotation of each mandrel. More generally, the control unit serves to drive all of the operating parameters of the winding machine, and in particular the movement in translation of the takeup mandrel when that movement is motor driven.

With such a machine, the fiber texture is wound onto the impregnation mandrel as follows: the free end of the fiber texture on the takeup mandrel is initially fastened to the impregnation mandrel by means of one or more holder devices as described below, and then the rotary drive motors of the mandrels are activated and driven by the control unit so as to apply an appropriate winding tension to the fiber texture.

The winding of the fiber texture onto the impregnation mandrel can then begin and takes place in the direction of rotation identified by arrow F in FIG. 1. By way of example, it may be necessary to perform 4⅛ revolutions in order to obtain a casing preform of thickness that complies with specifications.

FIG. 1 shows the configuration of the impregnation mandrel immediately before the end of winding. In this configuration, a portion of the cutting assistance device 100 in accordance with the invention is mounted on the impregnation mandrel 16.

Figure 2:
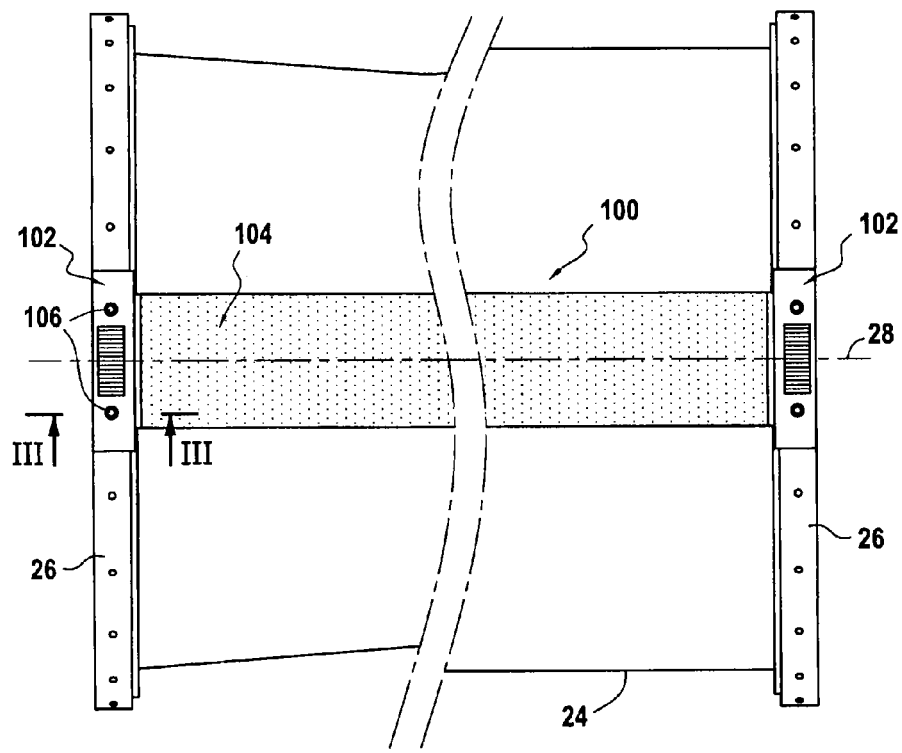
FIG. 2 is a view looking along arrow II of FIG. 1 showing a portion of the cutting assistance device in greater detail.
Figure 3:
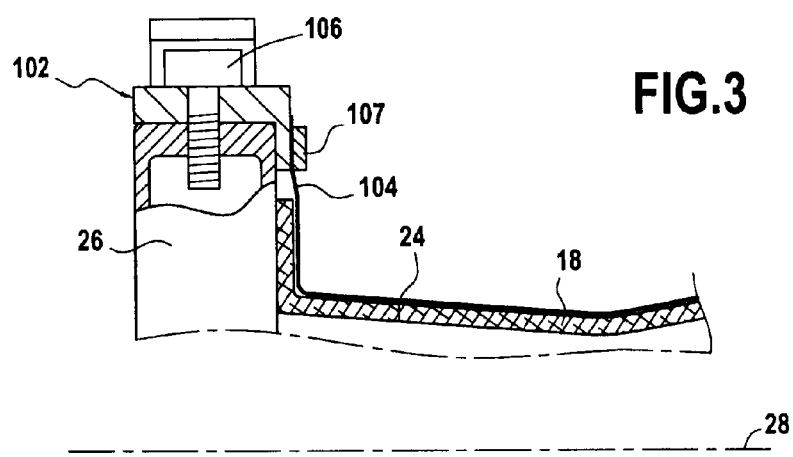
FIG. 3 is a section on III-III of FIG. 2.

More precisely, and as shown in FIGS. 2 and 3, the cutting assistance device 100 comprises in particular two positioning stops 102, each of which is positioned on one of the side plates 26 of the impregnation mandrel and which are connected together by a protective film 104.

More precisely, the positioning stops 102 are positioned on the side plates of the impregnation mandrel at a specific location and they are then held in position, e.g. by means of nut-and-bolt type systems 106.

The positioning stops 106 are made of rigid material. In order to save weight, they may for example be made of anodized aluminum.

The protective film 104 is in the form of a flexible sheet of plastics material (e.g. based on polyamide) that is substantially rectangular and that is fastened at each of its ends to respective ones of the positioning stops, e.g. by means of rivets 107. The protective film is thus a wear part that is easily replaced.

When in position on the impregnation mandrel, the protective film extends parallel to its axis of rotation 28 across its width. It is also positioned on the last layer of the fiber texture 18 wound onto the impregnation mandrel and is therefore to be found at the end of winding under the fiber texture layer 18' that is to be cut (see FIG. 7).

It should be observed in particular that the protective film covers the last layer of fiber texture 18 wound onto the impregnation mandrel, not only over its portion wound onto the outside surface 24 of the mandrel, but also over the corners formed between the outside surface and the side plates of the impregnation mandrel.

Thus, when the protective film 104 is in position on the implementation mandrel, it serves to protect the layer of the fiber texture that is situated underneath during the cutting operation. For this purpose, the thickness of the protective film depends in part on the tool used for making the cut. For example, if a cutting tool 200 of the cutter type is used manually, then thickness of about 3 mm should suffice.

Figure 4:
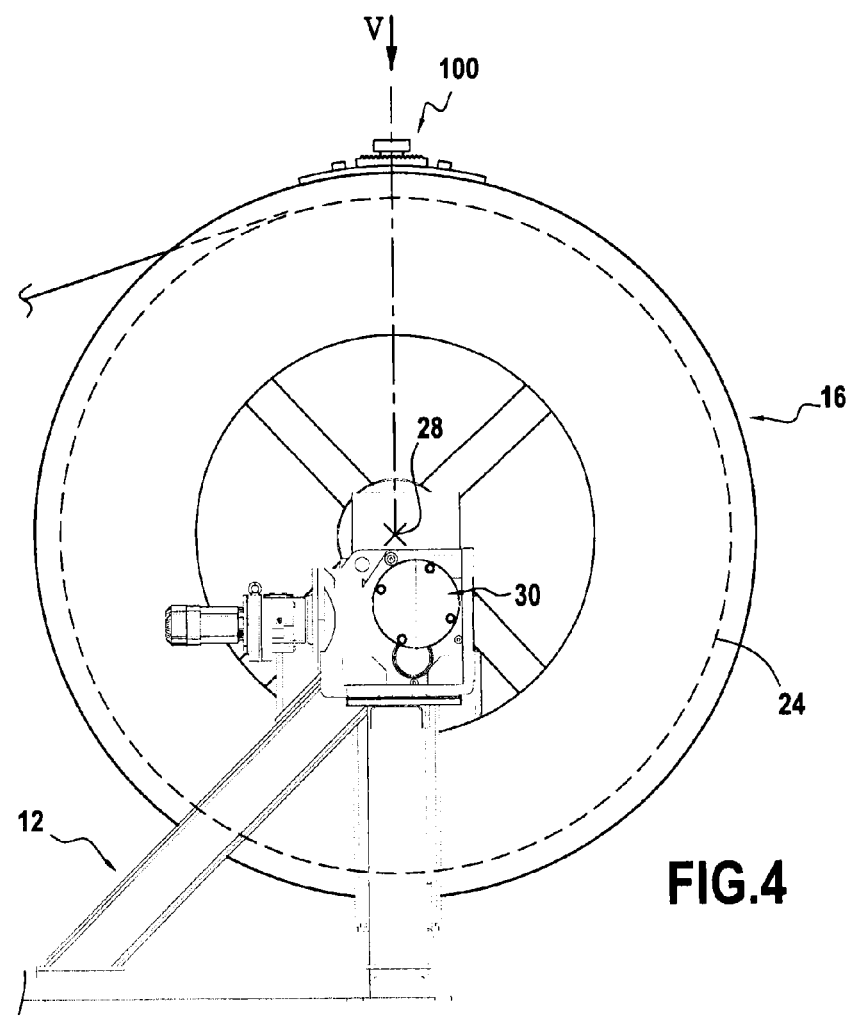
FIG. 4 is a view of the impregnation mandrel at the end of winding and prior to the cutting operation.

Once the positioning stops 106 have been fastened onto the side plates of the impregnation mandrel together with the protective film placed on the last layer of the fiber texture, the impregnation mandrel is turned about its axis of rotation 28 in order to bring the cutting assistance device 100 into an angular position that corresponds to 12 o'clock (see FIG. 4). By way of example, one-eighth of a revolution may be needed relative to the configuration shown in FIG. 1.

Figure 5:
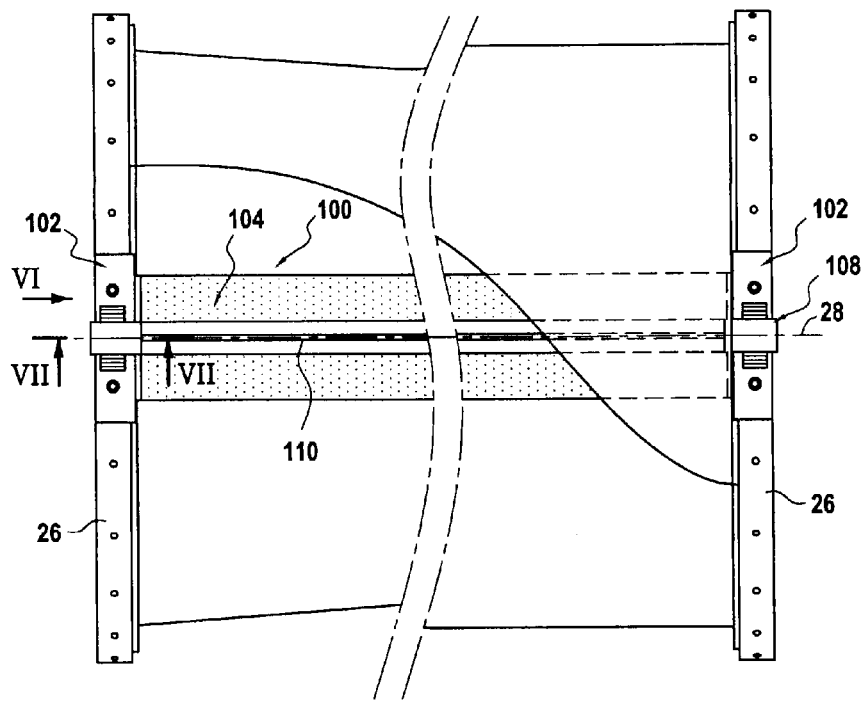
FIG. 5 is a view looking along arrow V in FIG. 4 showing the cutting assistance device.
Figure 6:
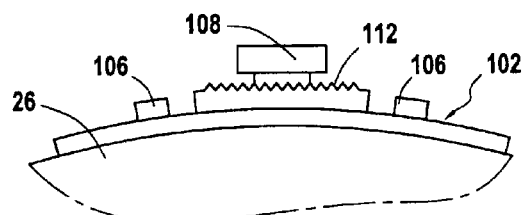
FIG. 6 is a view looking along arrow VI of FIG. 5.
Figure 7:
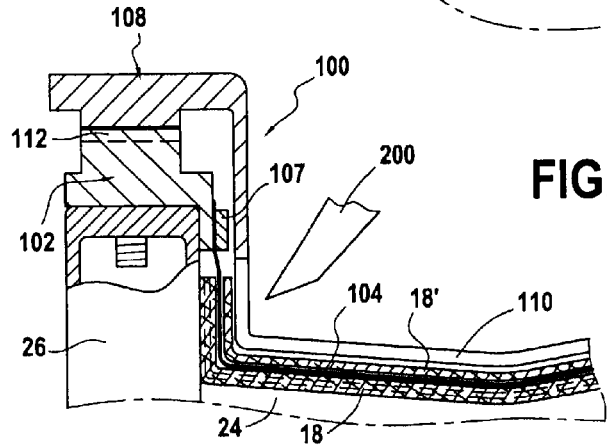
FIG. 7 is a section view on VII-VII of FIG. 5.

In this position, as shown in FIGS. 5 to 7, a plate 108 forming part of the cutting assistance device 100 and constituting a cutting jig is positioned on the fiber texture layer 18' that is to be cut in register with the protective film 104.

More precisely, this plate 108 may be constituted for example by a rigid metal sheet of substantially rectangular shape having its two ends positioned on respectively the positioning stops 102. The plate has a slot 110 that extends between its two ends and of appropriate dimensions (width) for passing the cutting tool 200.

When positioned on the positioning stops, the plate 108 extends parallel to the axis of rotation 28 of the impregnation mandrel across its entire width. It is positioned on the fiber texture layer 18' that is to be cut.

It should be observed that the slot 110 for guiding the cutting tool 200 is thus to be found in register with the fiber texture layer 18' that is to be cut not only over its portion wound onto the outside surface of the mandrel, but also over its corners formed between the outside surface and the side plates of the impregnation mandrel.

Advantageously, means are provided for adjusting the positions of the ends of the plate 108 on the positioning stops 102. For example, and as shown in FIG. 6, these position adjustment means may be in the form of teeth 112 of complementary shapes that are formed on facing surfaces of the positioning stops and the ends of the plate.

As a result, it is possible to refine the position of the plate 108 that forms a cutting jig, and thus to refine the position of the slot 110 for guiding the cutting tool 200, over the fiber texture layer 18' that is to be cut.

Once the plate forming the cutting jig is correctly positioned, it is possible to begin cutting proper of the fiber texture layer 18'. For this purpose, it is possible to use a cutter blade 200, for example. Naturally, any other cutting tool could be used (a mechanical tool, a laser, etc.).

The invention claimed is:

1. A device for assisting in cutting of a fiber texture layer wound on an impregnation mandrel of a winding machine, the device comprising:
    two positioning stops, each configured to be positioned on a respective side plate of the impregnation mandrel; and
    a plate forming a cutting jig configured to be positioned on the fiber texture layer that is to be cut, the plate including a slot extending in position between the side plates of the impregnation mandrel and serving to guide a cutting tool,
    wherein the positioning stops are connected to each other by a protective film for positioning under the fiber texture layer that is to be cut.

2. A device according to claim 1, wherein the protective film is made of a flexible plastics material.

3. A device according to claim 2, wherein the protective film is made of polyamide and possesses a thickness of an order of about 3 mm.

4. A device according to claim 1, further comprising fasteners which hold the positioning stops in position on the side plates of the impregnation mandrel.

5. A device according to claim 1, wherein the plate is configured to be positioned at each of its ends on the positioning stops.

6. A device according to claim 5, further comprising an adjusting device which adjusts positions of ends of the plate on the positioning stops.

7. A device according to claim 1, wherein the positioning stops are rigid.

8. A device according to claim 7, wherein the positioning stops are made of aluminum.

9. A winding machine for winding a fiber texture onto an impregnation mandrel, the machine comprising:
    a takeup mandrel for storing a fiber texture obtained by three-dimensional weaving, the takeup mandrel having an axis of rotation that is substantially horizontal;
    an impregnation mandrel onto which the fiber texture stored on the takeup mandrel is to be wound in superposed layers, the impregnation mandrel having an axis of rotation that is substantially horizontal and parallel to the axis of rotation of the takeup mandrel;
    at least one electric motor for driving the mandrels in rotation about their respective axes of rotation;
    a control unit for controlling the at least one electric motor for driving the mandrels in rotation; and
    a device for assisting in cutting a layer of the fiber texture according to claim 1.

* * * * *